US008881971B2

United States Patent
El-Awady et al.

(10) Patent No.: US 8,881,971 B2
(45) Date of Patent: Nov. 11, 2014

(54) TRANSIT AGENCY AS AN ISSUER AND/OR PROGRAM MANAGER OF PREPAID PRODUCTS

(75) Inventors: Khalid El-Awady, Mountain View, CA (US); Philip B. Dixon, San Diego, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1161 days.

(21) Appl. No.: 12/577,051

(22) Filed: Oct. 9, 2009

(65) Prior Publication Data

US 2010/0089995 A1   Apr. 15, 2010

Related U.S. Application Data (60) Provisional application No. 61/104,537, filed on Oct. 10, 2008.

(51) Int. Cl.
| | |
|---|---|
| *G06F 17/00* | (2006.01) |
| *G06Q 20/20* | (2012.01) |
| *G06Q 20/14* | (2012.01) |
| *G06Q 20/32* | (2012.01) |
| *G06Q 20/28* | (2012.01) |

(52) U.S. Cl.
CPC ............ *G06Q 20/3223* (2013.01); *G06Q 20/20* (2013.01); *G06Q 20/14* (2013.01); *G06Q 20/28* (2013.01)
USPC .......................................................... 235/375

(58) Field of Classification Search
CPC ........ G06Q 20/20; G06Q 20/32; G06Q 20/04; G06Q 20/341; G07B 15/00
USPC .......................................................... 235/375
See application file for complete search history.

(56) References Cited

U.S. PATENT DOCUMENTS

| | | | |
|---|---|---|---|
| 8,204,828 B1* | 6/2012 | Kuite et al. ...................... 705/41 |
| 2002/0198767 A1* | 12/2002 | Kim ................................ 705/13 |
| 2006/0278704 A1* | 12/2006 | Saunders et al. ............... 235/382 |
| 2008/0156873 A1* | 7/2008 | Wilhelm et al. ............... 235/384 |
| 2008/0179394 A1* | 7/2008 | Dixon et al. ................... 235/380 |

\* cited by examiner

*Primary Examiner* — Thien M Le
*Assistant Examiner* — Tae Kim
(74) *Attorney, Agent, or Firm* — Kilpatrick Townsend & Stockton LLP (57) ABSTRACT

Described is processing for requested user access, starting with receiving transaction data from a portable consumer device presented by the user at a gate access device of an access agency for the requested access. The transaction data from the gate access device is processed and a fee amount for the requested access is determined. The processing next involves determining an account balance in accordance with the determined fee amount and a prior balance amount associated with the portable consumer device, and reconciling the determined account balance and account data associated with the portable consumer device at a processing computer of the access agency such that the access request is indicated as either approved or declined.

17 Claims, 6 Drawing Sheets

TRANSIT AGENCY AS AN ISSUER AND/OR PROGRAM MANAGER OF PREPAID PRODUCTS

CROSS-REFERENCES TO RELATED APPLICATIONS

This application claims the benefit of priority from U.S. Provisional Application No. 61/104,537 filed Oct. 10, 2008 by A. Hammad et al. entitled "Transit Agency as Issuer of Prepaid Products". This application is related to patent applications entitled "Authentication of a Data Card Using a Transit Verification Value" by A. Hammad et al. U.S. patent application Ser. No. 11/680,594 filed Feb. 28, 2007 and "Verification of a Portable Consumer Device in an Offline Environment" to A. Hammad et al., U.S. patent application Ser. No. 11/680,592 filed Feb. 28, 2007; "Fraud Prevention for Transit Fare Collection" to A. Hammad et al. U.S. patent application Ser. No. 11/680,589 filed Feb. 28, 2007; "Bank Issued Contactless Payment Card Used in Transit Fare Collection" to A. Hammad et al. U.S. patent application Ser. No. 11/566,614 filed Dec. 4, 2006; and "Mobile Transit Fare Payment" to A. Hammad et al. U.S. patent application Ser. No. 11/536,296 filed Sep. 28, 2006. The contents of these related applications is incorporated herein by reference in their entirety for all purposes.

BACKGROUND

The transit industry has been adopting bank-issued payment cards at a rapid rate. Such payment cards are accepted at locations where access to a transit service is obtained, such as subway turnstiles, bus fareboxes, and the like. An access agency, such as a transit authority, controls access to the transit service. Payment cards are popular with patrons of transit services because the cards eliminate the need to carry cash for fare payment, and are popular with access agencies because the cards can speed the transaction process and reduce financial losses. Such cards are also popular with access agencies in allied industries that have a need to control access to facilities, such as museums and similar attractions, amusement parks, event venues, and the like.

Typically, an access agency establishes a business relationship with a card issuer, such as a bank or other financial institution, and arranges for patrons to be issued payment cards that can be used at access agency locations. The card issuer establishes an account with each patron for whom a payment card will be issued, and controls issuance, authorization, and payment processing on the patron's account. Thus, a patron of the transit authority or other access agency becomes an account holder with respect to the card issuer, and the payment card is personal to that individual patron. A typical arrangement between card issuers and account holders may permit the card issuer to charge fees directly to the account, or card issuer fees may be charged to the sponsoring access agency and either passed on to the patron or absorbed by the agency.

Transit payment cards are often of the contactless variety. In fact, such payment "cards" may not be cards at all, but may comprise payment tokens, smart cards, smart phones, and other such portable consumer devices. Smart phones, for example, may have stored data relating to the user account such that the smart phone can communicate wirelessly with access points such as contactless readers at turnstiles and fareboxes. Such communications may occur, for example, over communication networks such as Bluetooth or the like. Such payment-enabled portable consumer devices are configured to interface with the transit agency access points, including turnstiles and fareboxes, with short-duration data exchanges to facilitate the need for passing quickly through access points that is typical for the transit environment.

Bank-issued payment cards are issued by financial institutions, such as banks, who are members of an acquirer organization, such as Visa U.S.A. Inc. An issuing bank attends to account administration and has the authority and responsibility to approve or disapprove each transaction. Payment processing, involving the actual data processing operations and transfer of funds, may occur through the acquirer organization. Incentive programs, discounts, limited-time offers, and other special processing are easily handled by either the issuer or the acquirer. As noted above, an account for each transit patron to be issued a payment card is established by the issuing bank.

The transit environment inherently serves a large population of patrons that either do not possess or cannot acquire a bank card from a financial institution, or do not have a card of the right "type", for example a contactless payment card. The trend in the transit industry is to accept bank-issued payment cards directly at the farebox or turnstile, and often this may be further restricted to only payment cards of the contactless variety. Without a bank-issued contactless payment card, this segment of patrons may not be able to take advantage of all fare discounts, loyalty incentives, or features that other patrons might enjoy because they are able to obtain a bank-issued contactless payment card.

To better serve patrons who might not be able to obtain a payment card or who may not want to obtain one, transit authorities and other access agencies are turning to using prepaid cards. Prepaid cards in this context are bank-issued cards with corresponding user accounts associated with pre-loaded funds that are decremented with each use of the card. A prepaid card may be a non-reloadable or anonymous card that is provided with a beginning value or initial funding amount that is decremented with each use of the card down to a zero amount. The card is disposed of when the funding balance reaches zero. Such cards may be anonymous cards in the sense that they do not require the cardholder to maintain a bank relationship. Any person who presents the card at an access agency location is entitled to use the funding balance associated with the card. Other pre-paid cards may be associated with re-loadable accounts. These accounts may be re-loaded through many mechanisms, including the "Visa ReadyLink" system of Visa U.S.A., Inc., or through a payroll direct deposit system, or through employee-administered benefits management systems, or through kiosks located at access stations or other public locations, or various retail locations such as convenience stores, all of which support adding value to the account associated with the card to keep it active with funds. As noted above, these accounts are generally administered by the issuing bank associated with the card.

While use of this type of pre-paid card in transit may necessitate a contactless capability on the card, these cards will often also have a magnetic stripe as well that allows their use in traditional retail environments as well.

Issues have been identified with pre-paid cards to be used in transit as they relate to the cost, mechanisms, and processes of issuance/distribution of these cards, as well as the fees that typically get assessed to the cardholder. Issuance of these pre-paid cards is typically accomplished by member banks or other third parties that have relationships with the banks to sponsor such issuance. These parties typically make their return on investment by assessing various fees to the cardholder, such as through issuance or card acquisition fees, use or transaction fees, load or re-load fees, customer service fees, and monthly fees. Patrons who might not be able to obtain such cards are typically very sensitive to being charged such fees on top of fares for access transactions.

From the discussion above, it should be apparent that there is a need for payment processing in connection with access transactions that can accommodate patrons who might not qualify for conventional bank-issued payment cards or may not wish to obtain one. The present invention satisfies this need.

SUMMARY

Processing for requested user access involves receiving transaction data from a portable consumer device presented by the user at a gate access device of an access agency for the requested access, processing the transaction data from the gate access device and determining a fare amount for the requested access, determining an account balance in accordance with the determined fare amount and a prior balance amount associated with the portable consumer device, and reconciling the determined account balance and account data associated with the portable consumer device at a processing computer of the access agency such that the access request is indicated as either approved or declined. A transit authority or other access agency that acts as an issuer of a prepaid portable consumer device has a number of advantages over a transit authority or access agency that relies on other financial institutions for device issuance:

1. The access agency controls patron's ability to acquire a portable consumer device, such as a card (and could even mandate it for access), thereby reducing costs to patrons and more easily accommodating patrons who might not qualify for conventional bank-issued payment cards or may not wish to obtain one.
2. As an issuer, the access agency is responsible for determining authorization of the transaction. This may provide enhanced processing abilities within the access system, such as faster or more secure processing.
3. As an issuer, the access agency is entitled to obtain fees charged in association with use of the portable consumer device. In addition, these devices may be usable outside the access system (such as in retail) for which the access agency may partake in revenues generated from the device. Together these features offer revenue enhancement opportunities to the access agency and potentially brand/perception enhancement.
4. In addition, the agency-as-issuer gains control over program management such as loyalty and reward programs and incentive plans.

Other objects and advantages of the present invention will be apparent to one of ordinary skill in the art upon review of the detailed description of the present invention and the included figures.

DETAILED DESCRIPTION

Described herein is a technique comprising a method and system that encourage issuance of prepaid portable consumer devices, such as prepaid cards, by transit systems and other access agencies that wish to serve their under-banked patrons, or any patrons that may not want to utilize credit or debit cards in this environment. As described further below, the access agency acts as the issuer of the prepaid portable consumer device and as the program manager of the prepaid program, rather than being beholden to third parties outside the transit environment for these operations. This permits the access agency to selectively assess the selected fees to patrons so as to create a return on investment, while at the same time the access agency can limit the fees charged for transit to thereby encourage use of the prepaid portable consumer device. This scenario could also provide a revenue generating opportunity for the access agency.

Some of the benefits of the access agency acting as the issuer and program manager include providing a guaranteed supply of payment cards for patrons, providing supplemental revenue opportunity for the agency, and improved agency management and control of the prepaid portable consumer device and customer relationship. For example, the access agency may enable use of the portable consumer device in the open retail environment and collect fees for its use in retail transactions outside the transit environment, which can offset costs incurred in the access environment. In conjunction with acting as the issuer, the access agency has payment responsibility for all accepted transactions. That is, the access agency will have responsibility for determining authorization for a requested transaction.

Some access agencies will not have sufficient infrastructure, or will not want to construct or acquire or operate such infrastructure, to process access transactions completely from presentation at an access terminal such as a turnstile all the way through payment processing and reconciliation. Therefore, it is anticipated that an access agency will likely arrange a relationship with a processing third party, such as a payment processing organization to carry out such processing and reconciliation. Suitable payment processing organizations may include, for example, Visa, Inc., Mastercard Inc, Affiliated Computer Services, and numerous others. Payment processing organizations typically have extensive infrastructure to assist with processing, such as risk management controls, implementation of business rules, incentive programs, and the like. Because the access agency acts as an issuer, the access agency has greater control over card issuance and account management. Thus, the access agency can cater to the demands of its patronage, especially those who might be unable to obtain bank-issued payment cards or who might otherwise not want to use bank-issued cards in the transit access environment.

The access agency-issued prepaid portable consumer device described herein limits the cost of use within the transit fare payment environment. In general, such costs are under control of the issuer. The prepaid portable consumer device may also be used in the open retail environment, with typical retail fees assessed for use, but it is anticipated that use of the portable consumer device in connection with transit fares or other charges associated with access to facilities of the access agency will come at no extra charge to the user. This arrangement can make the prepaid portable consumer device a competitive alternative to traditional access agency-issued fare media such as tickets or passes, and may encourage patrons to prefer the open portable consumer device as the source of transit funds due to the additional functionality outside of the transit environment. The agency-as-issuer arrangement may also enhance the prepaid portable consumer device "stickiness" (i.e., activation and usage rate), and may enable the agency to rely completely on such cards for ridership, thereby permitting them to stop issuance of their own proprietary single-use fare media such as tickets, tokens, and passes in favor of the prepaid payment card described herein.

The prepaid portable consumer device described herein may be made available to patrons through retail locations such as check cashing and financial services provides (such as Ace Cash Express), convenience stores, drug stores, and general purpose merchandisers, as well as potentially through kiosks or vending machines at transit stations and at merchants conveniently located relative to transit stations and access points. The prepaid portable consumer device may also be reloadable via systems such as "Visa ReadyLink"™ prepaid load network of Visa U.S.A. Inc. The "Visa ReadyLink" system is currently available through "Safeway" stores and its affiliates, and in many convenience stores. A similar process is described in U.S. patent application Ser. No. 11/404,651, filed on Apr. 14, 2006, which is herein incorporated by reference in its entirety for all purposes.

The prepaid amount of funding establishes what is referred to herein as an account balance. It should be understood, however, that the "account balance" may comprise a funding amount that is maintained solely on the prepaid portable consumer device, providing a balance amount that is debited as the prepaid portable consumer device is used. Alternatively, the account balance may refer to a funding amount that is maintained by the issuing agency external to the prepaid portable consumer device, or the funding amount may be maintained on both the prepaid portable consumer device and at an account of the access agency. In any scenario, an account balance is associated with the prepaid portable consumer device and is debited with each authorized transaction.

The agency-issued prepaid portable consumer device is intended to encourage the minimization of fees assessed on transit rides, to the largest extent possible. Fees for use outside of transportation and venue access could be collected by the access agency as the issuer and could provide the agency with a return on investment. For example, a patron may be charged an up-front fee to acquire the prepaid portable consumer device, not to exceed a predetermined amount such as $5. This type of up-front charge is not uncommon in transit—for example, transit systems such as Washington Metropolitan Area Transit Authority (WMATA), Chicago Transit Authority (CTA), and Metropolitan Atlanta Rapid Transit Authority (MARTA) all charge similar amounts for the acquisition of their respective smart card-based fare media. Any fee associated with the agency-issued prepaid portable consumer device described herein would also likely limit misuse of the device, further contributing to return on investment for the access agency. The patron using the prepaid portable consumer device might not be charged any transaction fees when the device is used in a transit environment, or monthly fees might be waived if a certain level of transit activity is attained. The prepaid portable consumer device has the added benefit of being accepted at any retail location that accepts a Visa branded card. Use fees outside of transit, plus reload fees, may be charged as is typical with re-loadable prepaid products.

The agency-issued prepaid portable consumer device described herein will likely incorporate a co-brand relationship on the device. For example, if the prepaid portable consumer device is configured as a prepaid contactless payment card, then any payment processing organization or other processing system with which the access agency cooperates in implementing the payment card program will typically display its identifying logo on the payment card, but also an access agency logo or other agency-specific branding may be placed on the payment card to increase awareness of the potential use of the payment card in the access agency system.

In addition to the access agency and acquirer, the other participants in a prepaid portable consumer device scheme such as described herein would likely include the account sponsor and the account processor. The account sponsor will typically be an issuing bank with a payment processor relationship, such as with Visa U.S.A. Inc., and will also have rights to establish Visa accounts per Visa Operating Regulations, as well as to physically create the prepaid payment card itself (examples of such issuing banks include Metabank, Palm Desert Bank, and Wells Fargo Bank). That is, an access agency may cooperate with an issuing bank to thereby obtain access to acquirer operations and privileges. The issuing agencies may process their own accounts, but typically they will rely on a third party that performs this service on behalf of the issuer (those skilled in the art will be familiar with exemplary processing companies such as Affiliated Computer Services, Inc. ("ACS"), Galileo Processing, Inc., and Visa Debit Processing Service).

For an access agency to become an issuer of a prepaid portable consumer device, it would need to establish a relationship with entities that have access to creating accounts, such as Visa account numbers, and that can grant access to processing of transactions into the associated payment system. Some entities may be able to process all of the necessary paperwork and legal actions and thereby act as a one-stop-shop program manager. ACS and Galileo Processing, for example, have performed these services in the past in other industries and transactional environments.

For distribution of the prepaid portable consumer devices described herein, the issuing access agency has several alternatives, including but not limited to distribution by Web-based ordering and fulfillment; kiosk (or vending machines), either owned and operated by them or by other third parties (such as TIO Networks Corporation, and Ready Credit Corporation); retail merchant via "J" hook displays; and at transit ticket outlets in and around the transit environment.

Processing System

Figure 1:
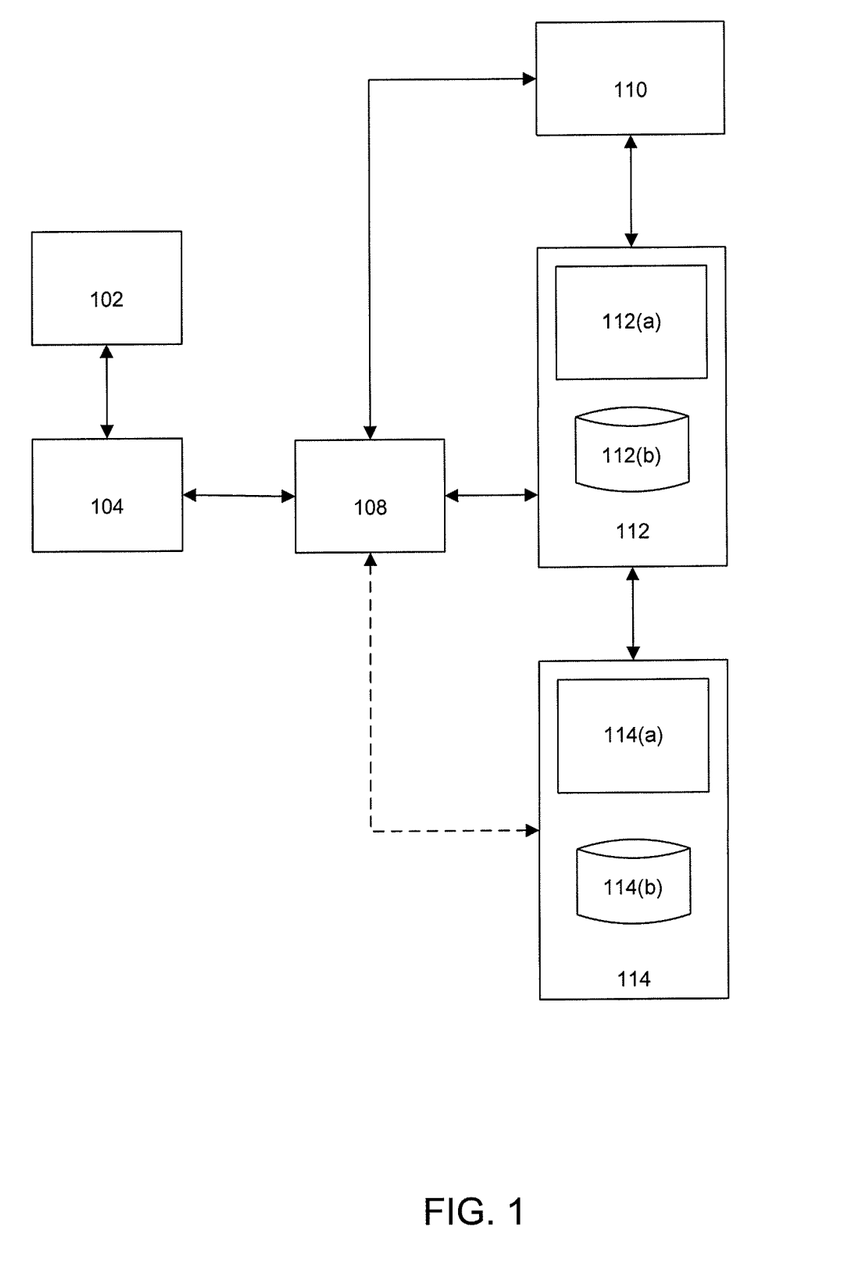
FIG. 1 is a depiction of a system that processes access requests by patrons using a prepaid portable consumer device issued by an access agency.

FIG. 1 is a depiction of a system that processes access requests by patrons using a prepaid portable consumer device issued by an access agency.

FIG. 1 shows a portable consumer device 102, a transit location comprising a gate access device 104, an access agency central computer 108, an acquirer 110, a payment processing network 112, including a server computer 112(*a*) and a database 112(*b*), and an access agency system 114 including a primary computer 114(*a*) and an associated database 114(*b*). FIG. 1 shows a dashed line connection between the access agency system 114 and the access agency computer 112 to indicate that these components may be implemented as a single network or may involve different computers at different locations, or some combination thereof. The above-described components can be in operative communication with each other, and/or may be operatively coupled to each other in any suitable manner. The acquirer 110 and access agency system 114 can communicate through the payment processing network 112.

The user of the prepaid portable consumer device 102 may also be a consumer of goods and/or services, and/or may be a patron of various transit systems.

Embodiments of the invention may include any suitable prepaid portable consumer device. For example, the prepaid portable consumer devices can be hand-held and compact so that they can fit into a consumer's wallet and/or pocket (e.g., pocket-sized). Examples of prepaid portable consumer devices may include cellular telephones, smart phones, personal digital assistants (PDAs), pagers, payment cards, payroll cards, security cards, access cards, smart media, transponders, and the like. Smart phones, for example, may have stored data relating to the user account such that the smart phone can communicate wirelessly with access points such as contactless readers at turnstiles and fareboxes. Such communications may occur, for example, over communication networks such as Bluetooth or the like.

The prepaid portable consumer devices 102 may interface with point of service (POS) terminals using any suitable mechanism including any suitable electrical, magnetic, or optical interfacing system. For example, a contactless system such as an RF (radio frequency) device recognition system or contact system such as a magnetic stripe may be used to interface with a POS terminal containing a contactless reader or a magnetic stripe reader, respectively. Suitable cards may include prepaid cards, stored value cards, gift cards, payroll cards, etc.

The prepaid portable consumer device 102 may include a volatile or non-volatile memory to store information such as the cardholder's primary account (PAN) number, name, and other information. In some embodiments, the prepaid portable consumer device 102 may have multiple functions. For example, the prepaid portable consumer device 102 can be used in a retail environment in some embodiments, and could also be additionally or alternatively used in a transit environment.

As shown in FIG. 1, the system may include an acquirer 110. The acquirer may be a bank that is associated with the access agency associated with the gate access device 104 at the transit location.

As used herein, an "acquirer" is typically a business entity, e.g., a commercial bank that has a business relationship with a particular merchant or an Automated Teller Machine (ATM). As noted, the access agency is acting an issuer, which is typically a business entity (e.g., a bank) that issues a portable consumer device such as a credit or debit card to a consumer. The access agency can perform the function of the issuer as described herein, and also can perform the function of the acquirer, if desired. Embodiments of the invention encompass such single-entity functionality.

The gate access device 104 can be located at any suitable placement associated with controlling access to a service or venue. For example, the gate access device can be placed at a bus stop, a subway station, a train station, an airport, and the like in a manner so as to control access to the transit service or venue. Although "transit" is discussed in detail herein, embodiments of the invention can be used in any suitable situation where access to a particular location is desired, but is conditional upon authorization (e.g., building access or venue access).

Each of the computers 108, 112(a), 114(a) shown in FIG. 1 can be a powerful computer or cluster of computers. For example, the payment processing computer 112(a) can be a large mainframe, a minicomputer cluster, or a group of servers functioning as a unit. In one example, the payment processing computer comprise a database server coupled to a Web server. The computer 112(a) may also comprise a processor, and a computer readable medium.

The payment processing network 112 may comprise or use a payment processing network such as VisaNet™. The payment processing network 112 and any communication network that communicates with the payment processing network may use any other suitable wired or wireless network, including the Internet. The payment processing network 112 may be adapted to process ordinary debit or credit card transactions.

The access agency system 114 may also have a primary computer 114(a) and a database 114(b) associated with the primary computer. If the above-described gate access device 104 comprises a first processor and a first computer readable medium associated with the first processor, then the primary computer 114(a) may comprise a second processor and a second computer readable medium. The second computer readable medium comprises code or instructions for receiving the authorization request message, generating the authorization response message, and then sending the authorization response message to the gate access device 104.

The access agency computer 108 may comprise a third processor and a third computer readable medium. The computer readable medium may comprise instructions or code for determining a transit fare after the user enters the location, and then sending data relating to the transit fare to the acquirer 110, which may be associated with the access agency.

For simplicity of illustration, a specific number of components is shown in FIG. 1. However, it should be understood that in other embodiments, there can be many more components or fewer components.

In this description, the prepaid portable consumer device may be described in terms of a contactless smart card, but it should be understood that, in fact, such "cards" may not be cards at all, but may comprise a variety of payment techniques, such as payment tokens, smart cards, smart phones, and other portable consumer devices that enable payment.

As noted above, the prepaid portable consumer device is provided by an access agency acting as an issuer. One characteristic of an issuer is that an issuer has responsibility for the transaction authorization decision. Thus, the authorization responsibility in connection with the access transactions described herein is borne by the access agency. The access agency, however, is not likely to have facilities and infrastructure to actually produce, deliver, and manage the prepaid portable consumer devices and associated accounts. Therefore, the access agency will likely have an arrangement with an account sponsoring entity to do so. The account sponsor will typically be an issuing bank with a payment processing organization relationship, such as with Visa Inc., and will also have rights to establish Visa accounts per Visa Operating Regulations, as well as to physically create the prepaid portable consumer device itself. Examples of such issuing banks with whom the issuing agency may cooperate include Metabank, Palm Desert Bank, and Wells Fargo Bank, N.A.

When a user wants to request access, the user presents the prepaid portable consumer device 102 at the gate access device 104, which is located at a fare collection or venue entrance point. Presenting the portable consumer device at the gate access device initiates an access request. At the gate access device, data stored in a computer readable medium in the prepaid portable consumer device 102 such as on-card account balance, user primary account number (PAN) information, expiration date, service codes, and the like may be read by a reader in the gate access device. The gate access device 104 may also have any encryption keys and associated algorithms for processing authentication data on the prepaid portable consumer device 102, and thus may authenticate the device at the time of the transaction. Such keys and/or algorithms may be stored in a computer readable medium embodied by a memory device in the gate access device 104. If the PAN and expiry date information are validated at the gate access device 104 and by a processor located therein, along with any other data being used to authenticate the prepaid portable consumer device 102 at the gate access device 104, then the user passes by the gate access device or is otherwise allowed access to the service or entry to the venue.

The gate access device 104 then forwards the PAN information in a message which passes out of a network interface in the gate access device to the access agency central computer 108 along with the time, date, and location of the transaction. The access agency central computer performs a fee calculation based on the information from the gate access device 104 and the history of transactions for the prepaid portable consumer device 102 (which is uniquely identified by the PAN), along with the fee policy as defined by the access agency. The card information stored in a computer readable medium in the contactless prepaid card 102 is typically passed to the access agency central computer 108 some time after the fee transaction occurs. The time before the data is passed can be a matter of seconds or minutes, or a longer time. For example, in the case of a transport bus, the fee collection data might not be forwarded to the access agency central computer 108 until the bus returns to a garage facility at the end of a run or at the end of the day.

At the access agency central computer 108, payment processing is performed as defined by the access agency. For example, the access agency may implement payment models with a variety of schemes, such as pay-as-you-go, one transaction at a time, an aggregation of many transactions into an aggregated amount based on time or value, and prepaid accounting, where a proxy account is created and is reduced by each transaction amount until a top-up of the proxy account is required based on time or value.

After the fare calculation POS transaction processing is complete, the access agency central computer 108 processes the payment total through the access agency system 114, which may approve or decline the transaction. For example, the access agency system might identify the data from the prepaid portable consumer device 102 as including a PAN that identifies an unauthorized user or an account with a stolen card, or that identifies a user who is not authorized for the transaction being processed. In that situation, the access agency would likely decline the transaction at the access agency system processing 114.

The access agency central computer 108 and access agency system processing 114 comprise back-office processing, or processing not at the point of access such as the turnstile, and may be performed in one operation or at different locations, as desired. The access agency system processing may be performed by the access agency itself, or the access agency may have a contractual arrangement with a third party to perform such services. The third party may comprise, for example, payment processing organizations such as Visa U.S.A. Inc. and MasterCard Inc., or a processing company such as Affiliated Computer Services, Inc. ("ACS"), Galileo Processing, Inc., and Visa Debit Processing Service.

Processing

Figure 2:
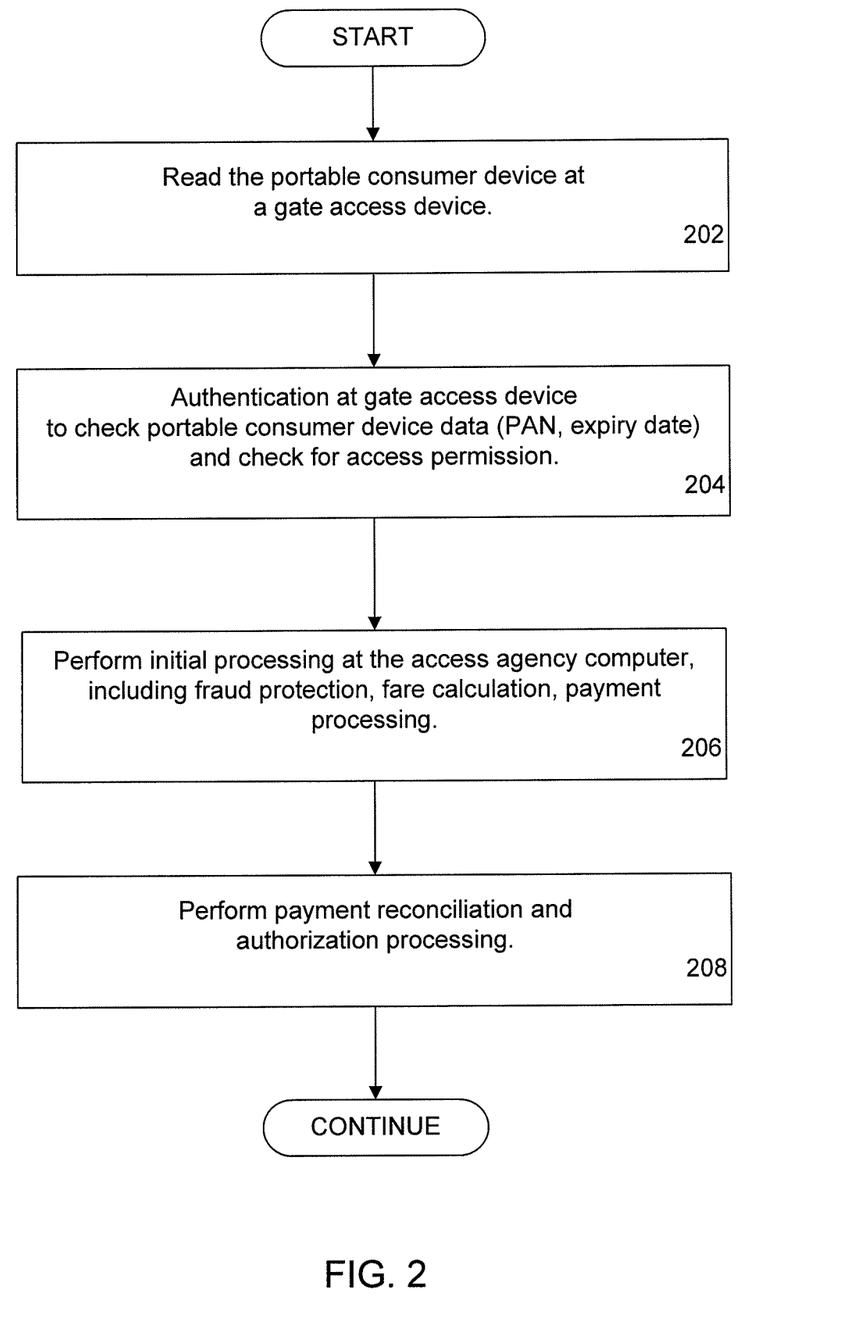
FIG. 2 is a flowchart that illustrates the operations performed by the processing system of FIG. 1 for the agency-issued prepaid portable consumer device.

FIG. 2 is a flowchart that illustrates the processing operations for access fee collection with the prepaid portable consumer device 102 and further describes the system operations illustrated in FIG. 1. The initial operation, indicated by the FIG. 2 flowchart box 202, occurs when the prepaid portable consumer device is read by a contactless processing reader at the gate access device. At the initial operation 202, data such as account balance, personal account number (PAN) information, expiration date, service codes, and the like may be read directly from the device. Any encryption keys and associated algorithms for processing authentication data will be utilized for processing such data.

At box 204, if the PAN information and expiry date information validate the prepaid portable consumer device, then the gate access device is raised or opened to allow the user to pass and gain entry. That is, if the information obtained at the gate access device does not result in a rejection of the prepaid portable consumer device, then the device is considered authenticated, and the PAN information and associated device data is forwarded to the access agency central computer along with the time, date, and location of the transaction. If the device is considered authenticated at 204, the patron is allowed to enter the venue or obtain the service without further fare processing. Additional fare processing is required as described below, but the patron movement through the gate access device is not encumbered by the additional processing.

At box 206, the device information is passed to the access agency computer system over a data network some time after the patron access occurs. The time before the data is passed can be a matter of seconds or minutes, or a longer time. For example, in the case of a transport bus, the fare collection data might not be forwarded to the access agency central computer until the bus returns to a garage facility at the end of a run or at the end of the day.

At the access agency central computer system processing 206, a variety of processing features can be implemented. For example, the access agency central computer can perform a special fare calculation based on the history of transactions for the prepaid portable consumer device along with the fee policy as defined by the access agency. Thus, a user's account balance and the current fee charges can be reconciled at box 206. Any balance adjustment can be credited back to the user account, or if the account funding balance is maintained on the device, an adjustment can be performed at the next reload operation.

At box 208, once the authorization is granted and initial payment processing is complete at the access agency central computer, account reconciliation processing may be performed. If desired, all processing following authorization by the access agency may be performed by third party processors, such as payment processing companies including processing companies such as ACS, Galileo Processing, Inc., and Visa Debit Processing Service.

Prepaid Payment Card Features

The processing and business relationships described thus far support a novel access agency-as-issuer scheme with the following features. According to the scheme described herein, a payment processing entity can perform transaction processing for the access agency and can receive transaction fees in return. An account sponsor provides issuer services such as production or manufacture of each prepaid portable consumer device, and may perform account management duties in conjunction with a payment processing entity or other third party processor. The account sponsor may collect revenue via charges or transaction fees associated with use of the prepaid portable consumer device. A third party transaction processor may be involved, for performing transaction processes and administering customer service on the accounts on behalf of the access agency. Meanwhile, the access agency itself will provide payment of fees to the associated sponsors and processing entities. The access agency will have many opportunities to recoup funds for payment of the sponsor fees through charges to patrons or other associated entities, including issuance or acquisition fees, use or transaction fees, load or re-load fees, customer service fees, and monthly account fees.

Acting as a program manager for the portable consumer device, the access agency can establish a reload network for reloading of the account balance. Terminals of the reload network can comprise a variety of already-present access agency infrastructure as well as new devices integrated into the infrastructure. For example, the access agency could include a reload function at kiosks through which users presently purchase transit tokens and the like. Such reload terminal processing can be carried out through communications between the kiosks and the agency computer 108.

Alternative Transit Applications with Open Payments for Retail Use

The implementation of the access agency-issued prepaid portable consumer devices described herein may be achieved utilizing open payment contactless bank cards. There may be obstacles to such implementation due to the time, effort, and cost it takes to implement new technology or contactless payment readers and architecture in the access agency environments. As an alternative, the prepaid scheme could use a dual-application prepaid portable consumer device approach wherein a contactless payment card includes an application for the access agency that works in a closed proprietary mode, as already implemented by the access agency, and also includes an application that works in the open payment model for the retail environment, using contactless and magnetic stripe financial payment mechanisms.

These dual-application cards can be implemented in a number of ways. For example, separate payment and transit applications can be provided, one on-chip in the card and one for payment on magnetic stripe only, or an access application can be provided on-chip and open payment can be provided on a separate chip (i.e., a two-chip solution). In the case of a dual-chip implementation, a single antenna or separate antennas for each application can be used.

Integrated payment and access agency applications can be provided with a single chip for payment and access, or emulation of one of the two methods. When combined in this fashion with a multi-application prepaid portable consumer device, a few more opportunities may arise for the access agency as an issuer of the device. For example, the implementation may be seamless, quick, and much less expensive due to the fact that infrastructure already exists in the agency infrastructure to process their private application. It would act exactly as it does with their currently issued private cards.

In addition, as an issuer, the access agency may be more easily able to implement loyalty functions paid for by the merchants in and around their transit hubs. For example, such schemes may involve merchants who provide loyalty incentives such as complimentary products or prize money in the expectation of additional spending by patrons in response. The access agency itself may compensate a payment processor such as Visa Inc., for processing in connection with loyalty programs using the fees generated from the merchants for their loyalty programs.

Thus, the agency-as-issuer business model provides ample opportunity for such agencies to better control distribution of prepaid portable consumer devices to patrons who might be unable to obtain bank-issued cards or who do not want to use their bank-issued cards in the access agency transit environment. The additional programs and features that can be administered by the access agency in connection with the agency-as-issuer model provide opportunities for revenue growth that can fund such payment card programs. For example, there is potential to reduce the fees assessed to patrons, because part of the loyalty feature program could be to charge no fees for retail use as long as the prepaid portable consumer device is also used in the access agency transit environment, and this would likely encourage card use for transit. If not used in the access agency environment, then typical retail fees could still apply as with any re-loadable prepaid card.

The techniques described herein may be used in conjunction with other features for portable consumer devices. Such features may include, for example, negative list processing and verification value processing. These features are described in co-pending applications entitled "Authentication of a Data Card Using a Transit Verification Value" by A. Hammad et al. U.S. patent application Ser. No. 11/680,594 filed Feb. 28, 2007 and "Verification of a Portable Consumer Device in an Offline Environment" to A. Hammad el al., U.S. patent application Ser. No. 11/680,592 filed Feb. 28, 2007; Fraud Prevention for Transit Fare Collection" to A. Hammad et al. U.S. patent application Ser. No. 11/680,589 filed Feb. 28, 2007.

Figure 3:
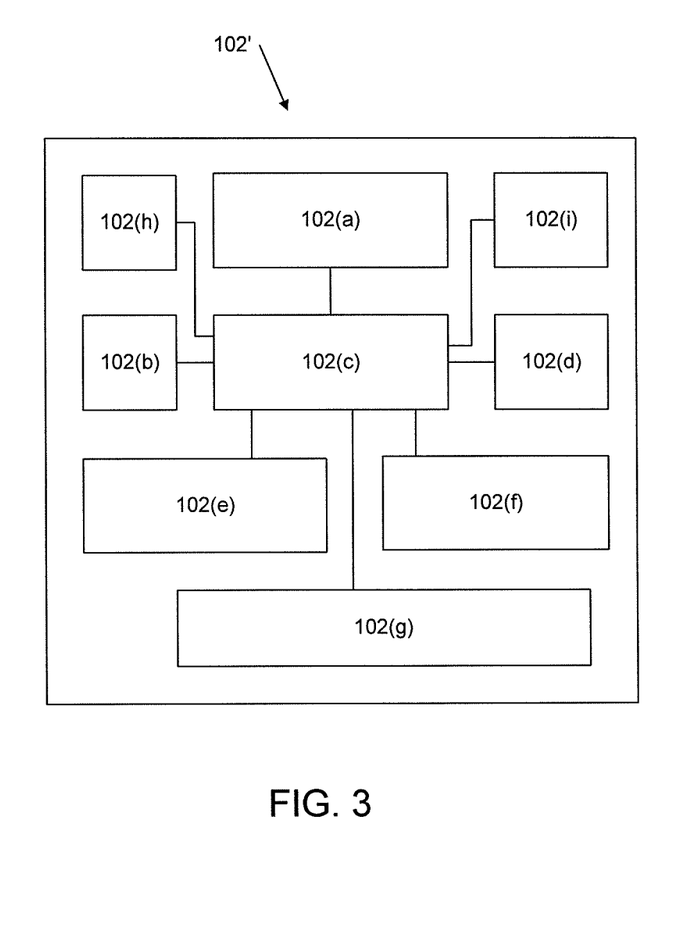
FIG. 3 is a block diagram of an exemplary prepaid portable consumer device in the form of a cellular telephone.

An exemplary prepaid portable consumer device 102' in the form of a cellular telephone may comprise a computer readable medium and a body as shown in FIG. 3. (FIG. 3 shows a number of components, and the portable consumer devices according to embodiments of the invention may comprise any suitable combination or subset of such components.) A computer readable medium 102(*a*) may be present within a body 102(*b*), or may be detachable from it. The body 102(*b*) may be in the form of a plastic substrate, housing, or other structure. The computer readable medium 102(*a*) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, and the like. Any of this information may be transmitted by the portable consumer device 102.

In some embodiments, and regardless of the type of portable consumer device that is used, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The prepaid portable consumer device 102' may further include a contactless element 102(*g*), which is typically implemented in the form of a semiconductor chip (or other data storage element) with an associated wireless transfer (e.g., data transmission) element, such as an antenna. The contactless element 102(*g*) is associated with (e.g., embedded within) portable consumer device 102' and data or control instructions transmitted via a cellular network may be applied to the contactless element 102(g) by means of a contactless element interface (not shown). The contactless element interface functions to permit the exchange of data and/or control instructions between the mobile device circuitry (and hence the cellular network) and the optional contactless element 102(g).

The contactless element 102(g) is capable of transferring and receiving data using a near field communications ("NEC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 102' and an interrogation device. Thus, the portable consumer device 102' is capable of communicating and transferring data and/or control instructions via both cellular network and near field communications capability.

The portable consumer device 102' may also include a processor 102(c) (e.g., a microprocessor) for processing the functions of the portable consumer device and a display 102(d) to allow a consumer to see phone numbers and other information and messages. The portable consumer device 102' may further include input elements 102(e) to allow a consumer to input information into the device, a speaker 102(f) to allow the consumer to hear voice communication, music, etc., and a microphone 102(h) to allow the consumer to transmit his/her voice through the portable consumer device 102. The portable consumer device 102 may also include an antenna 102(i) for wireless data transfer (e.g., data transmission).

If the portable consumer device 102 is in the form of a debit, credit, or smartcard, the portable consumer device may also optionally have features such as magnetic stripes. Such devices can operate in either a contact or contactless mode.

Figure 4:
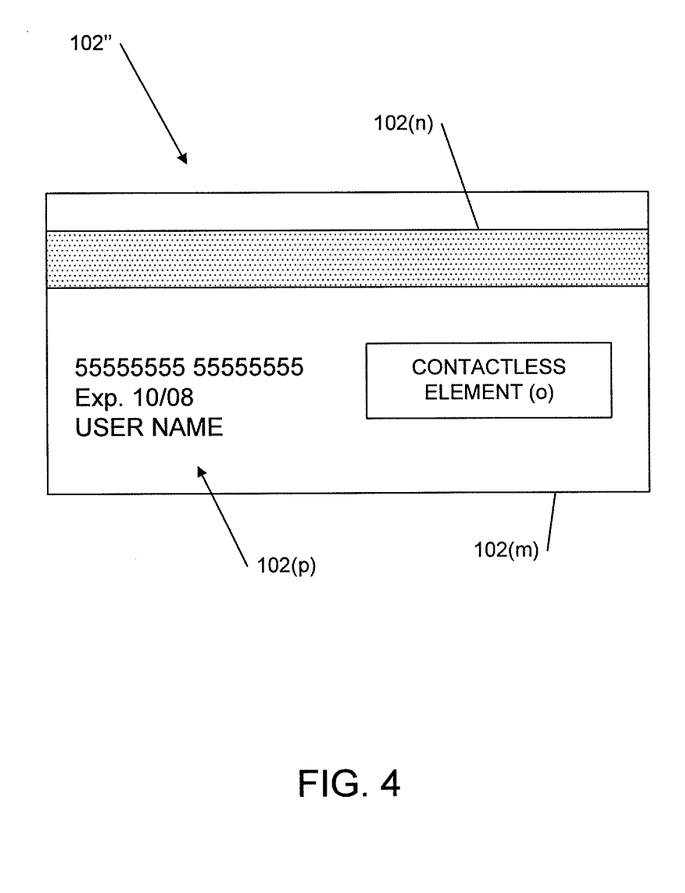
FIG. 4 is a diagram of an exemplary prepaid portable consumer device in the form of a card.

An example of a portable consumer device 102" in the form of a card is shown in FIG. 4. FIG. 4 shows a plastic substrate 102(m). A contactless element 102(o) for interfacing with an access device 34 may be present on or embedded within the plastic substrate 102(m). Consumer information 102(p) such as an account number, expiration date, and consumer name may be printed or embossed on the card. Further, a magnetic stripe 102(n) may also be on the plastic substrate 102(m). The portable consumer device 102" may also comprise a microprocessor and/or memory chips with user data stored in them.

As shown in FIG. 4, the portable consumer device 102" may include both a magnetic stripe 102(n) and a contactless element 102(o). In other embodiments, both the magnetic stripe 102(n) and the contactless element 102(o) may be in the portable consumer device 102". In other embodiments, either the magnetic stripe 102(n) or the contactless element 102(o) may be present in the portable consumer device 102".

Figure 5:
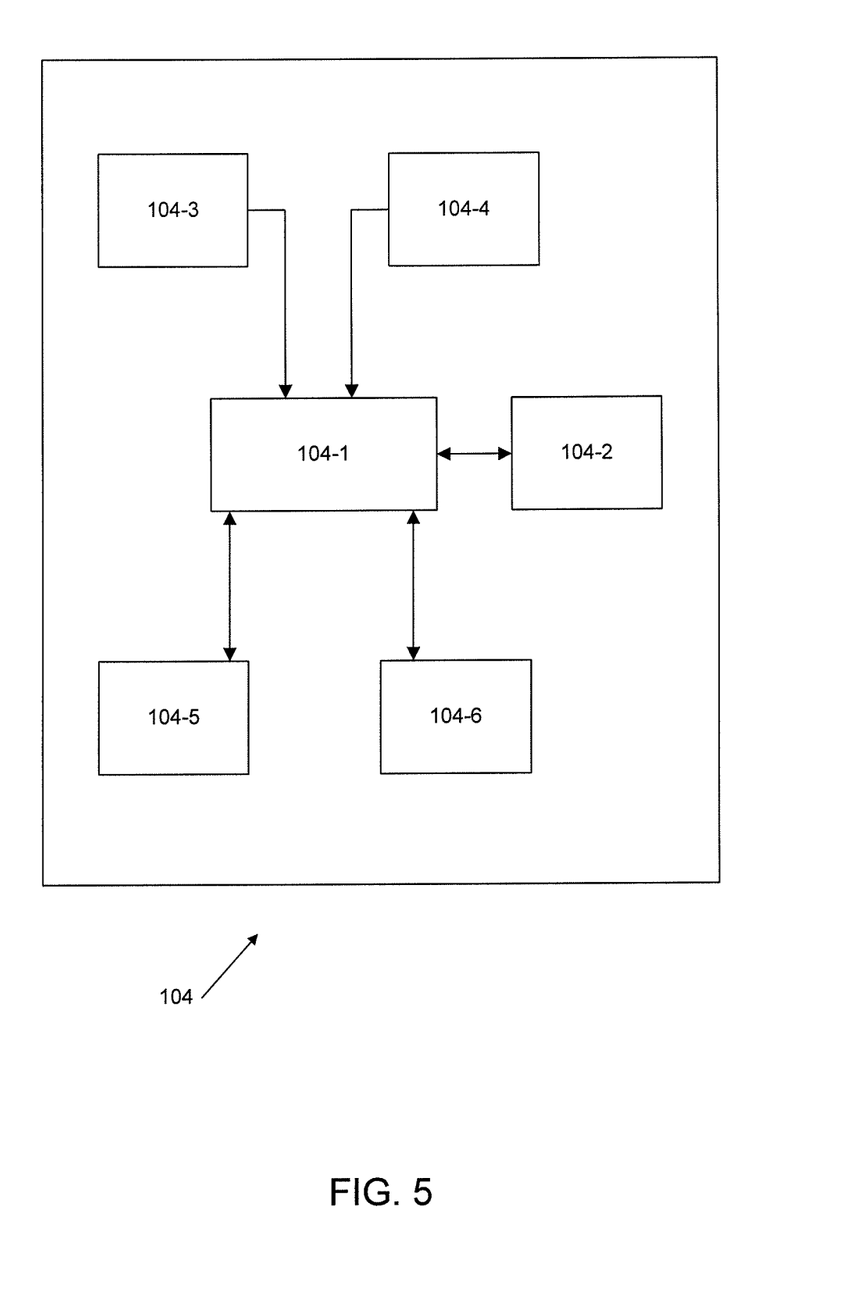
FIG. 5 is a block diagram of an exemplary gate access device of the system illustrated in FIG. 1.

FIG. 5 is a block diagram showing basic components that may reside in an exemplary gate access device 104. An exemplary gate access device 104 may comprise a processor 104-1. The gate access device may also comprise a computer readable medium 104-2, a portable consumer device reader 104-3, a gate device 104-4 such as a turnstile, a barrier, a gate etc., an output device 104-5, and a network interface 104-6, all operatively coupled to the processor 104-1. A housing may house one or more of these components. Exemplary portable consumer device readers can include RF (radio frequency) antennas, magnetic stripe readers, etc. that interact with the portable consumer device 102. Suitable output devices may include displays and audio output devices. Exemplary computer readable media may include one or more memory chips, disk drives, etc. In some embodiments, an output device could also be caused to operate by an appropriate gate device, if the gate device actuates to cause the output device to provide a message indicating that the user is authorized to proceed.

The computer readable medium 104-2 may store code or instructions for allowing the gate access device 104 to operate in the manner described herein. The instructions may be executed by the processor 104-1. The computer readable medium may comprise code or instructions for receiving a request for access to a location at a gate access device from a user, and generating an authorization request message, where the authorization request message includes a request to charge a predetermined amount of money to pay for access to the location, sending the authorization request message to an issuer for approval, and receiving an authorization response message, wherein the authorization response message indicates whether or not the charge is authorized or not authorized, and if the authorization response message indicates that the charge is authorized, then allowing the user to access the location.

The network interface 104-6 may allow the gate access device 104 to send and receive messages from the access agency central computer 108, acquirer 110, payment processing network 112, and/or access agency system 114.

Figure 6:
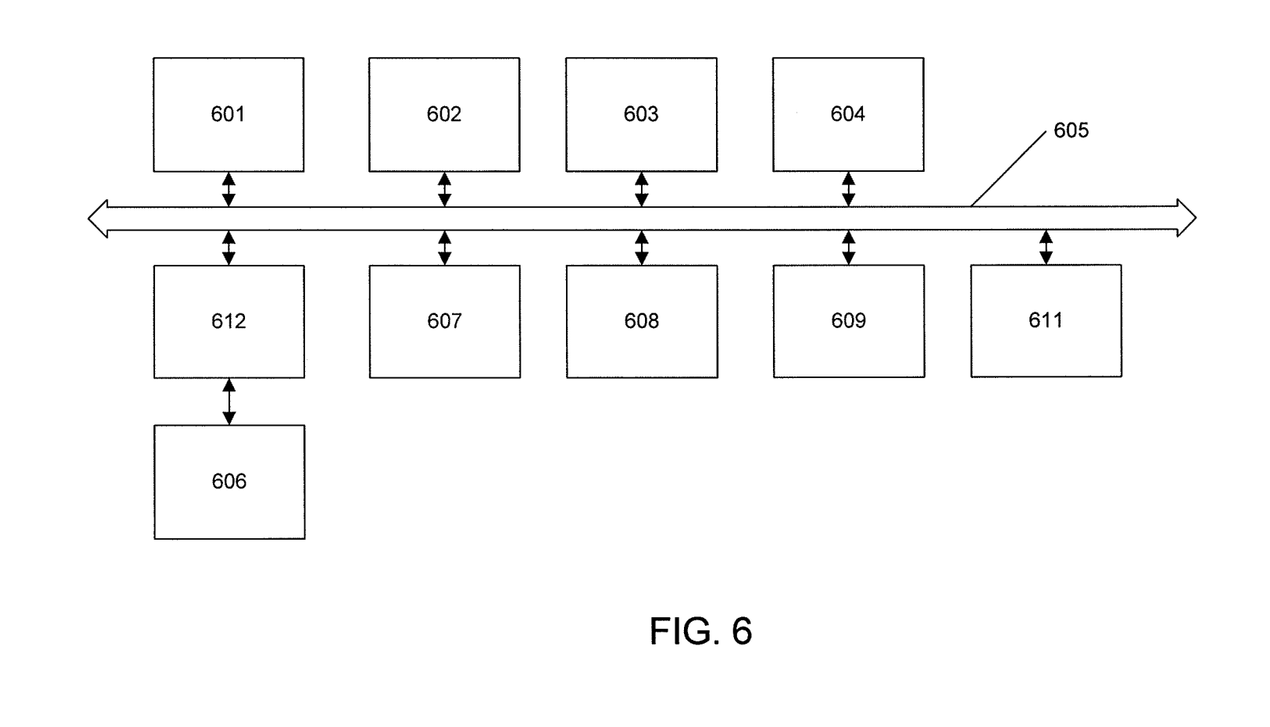
FIG. 6 is a block diagram of a computer for use in the systems of FIG. 1 and FIG. 7.

FIG. 6 shows a block diagram of a computer. Any of the computers 108, 112(a), 114(a) in FIG. 1 may utilize any suitable number of subsystems. Examples of such subsystems or components are shown in FIG. 6. The subsystems shown in FIG. 6 are interconnected via a system bus 605. Additional subsystems such as a printer 604, keyboard 608, fixed disk 609, monitor 606, which is coupled to display adapter 612, and others are shown. Peripherals and input/output (I/O) devices, which couple to an I/O controller 601, can be connected to the computer system by any number of means known in the art, such as a serial port 607. For example, the serial port 607 or an external interface 611 can be used to connect the computer to a wide area network such as the Internet, a mouse input device, or a scanner. The interconnections via the system bus 605 allows the central processor 603 to communicate with each subsystem and to control the execution of instructions from the system memory 602 or the fixed disk 609, as well as the exchange of information between subsystems. The system memory 602 and/or the fixed disk 609 may embody a computer readable medium.

Figure 7:
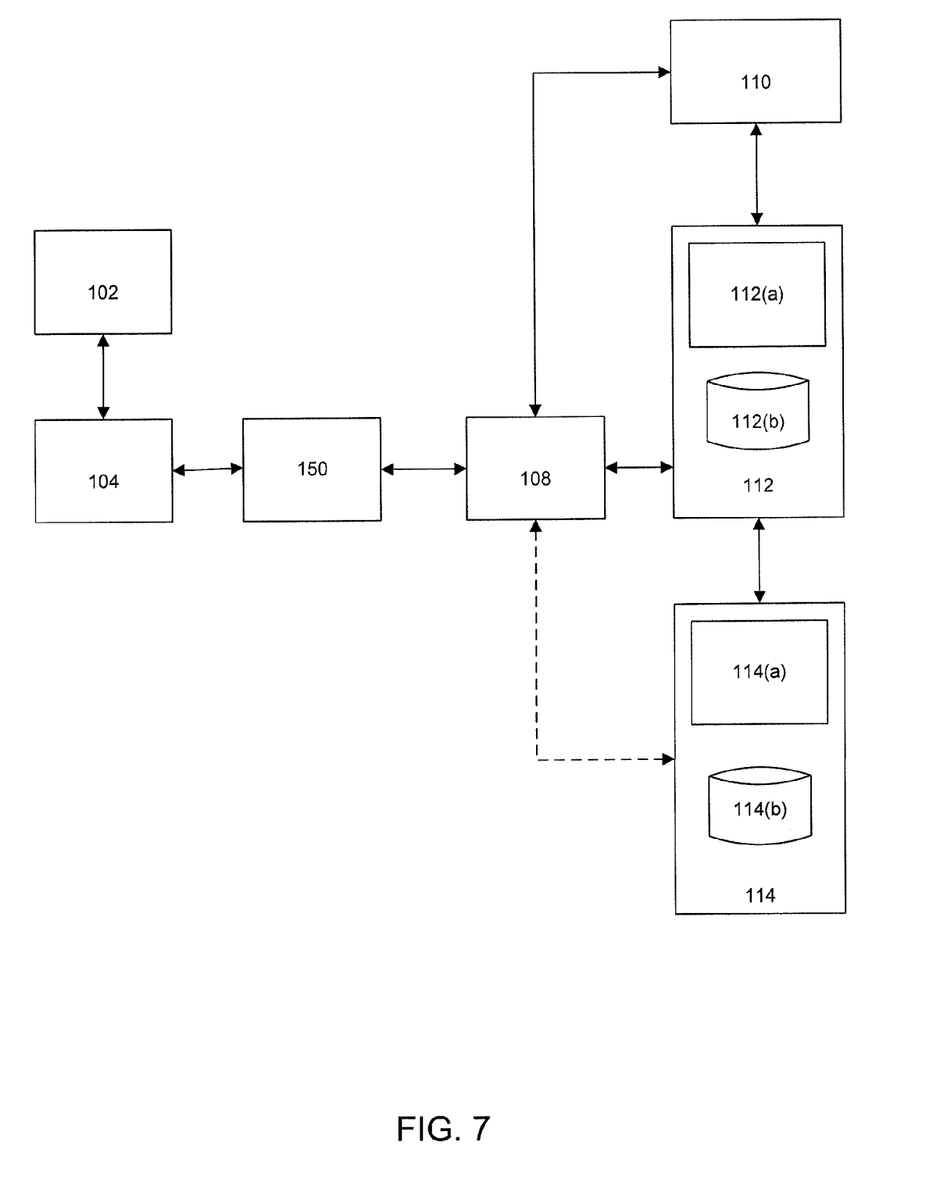
FIG. 7 is an alternative embodiment of a system constructed in accordance with the present invention.

FIG. 7 shows another system according to another embodiment of the invention. In FIG. 1 and FIG. 7, like numerals designate like components and the descriptions thereof need not be repeated here.

FIG. 7 shows an additional secondary computer 150, which is located between the gate access device 104 and the server computer 112(a) in the payment processing network 112. The secondary computer 150 may be suitable for processing authorization request messages from the gate access device 104, wherein the secondary computer is closer to the gate access device 104 than the primary computer 114(a) at the access agency's primary location. The secondary computer 150 can primarily process authorization request messages associated with access transactions, whereas the primary computer 114(a) may be able to process both normal retail transactions and also access transactions such as transit transactions. More specifically, a processor in the secondary computer 150 can primarily process authorization request messages associated with access transactions. The secondary computer 150 may comprise any suitable combination of components shown in FIG. 6.

The secondary computer 150 may be run or updated by the access agency system 114, or some other entity (e.g., a payment processing organization such as Visa). The secondary computer 150 may store a number of predetermined rules that will allow it to make a decision on the authorization request message. Because the secondary computer 150 makes the decision and the authorization request message does not need to be received by the primary computer 114(a) operated by the access agency, the authorization decision can be made more quickly than in a situation where the authorization request message is sent to the primary computer 114(a).

Thus, as described herein, a transit system or other access agency may act as an issuer of a prepaid portable consumer device, such as a prepaid payment card. The access agency can thereby reduce costs to patrons and more easily accommodate patrons who might not qualify for conventional bank-issued payment cards or prefer not to use such cards in access transactions. The access agency can also assume the duties of a program manager.

Some of the activities ordinarily performed by a program manager include:
(1) Plan program, execute, and manage overall relationship with the cardholder
(2) Manage card manufacture and personalization processes
(3) Educate cardholders, perform marketing and promotions
(4) Maintain relationships with legal & regulatory bodies
(5) Report on program and carry responsibility for overall profitability
(6) Set fees
(7) Manage cardholder accounts, including reloading of prepaid cards
(8) Authorize transactions
(9) Perform risk management
(10) Manage customer service and IVR
(11) Provide other value added services
Activities ordinarily performed by an issuer include:
(1) Hold funds
(2) Extend credit
(3) Settle with acquirer In some instances, the communication between the various transit system access devices and the previously described access device processors and transit system computers may be too slow, and some alternative action is preferably taken. For example, there may be instances where the access device processors and transit system computers are temporarily overloaded with data and their response time may be slow, and/or there may be some other disruption in communication (e.g., a router is not functioning for the moment). In this case, a transit system access device could simply let the user into the transit location, before an authorization response message is received by the transit system access device. A computer readable medium in the transit system access device may comprise code for a timeout feature such that if a response message is not received within a predetermined time (e.g., 200 ms, 400 ms, or 800 ms, 2 seconds, 3 seconds, 4 seconds, or 5 seconds), then the transit system access device may let the user into the transit location. During the user's journey, the transit system is able to evaluate the authorization request message and respond to it. A transit system access device at an exit transit location at the end of the user's journey could prevent the user from exiting the exit transit location if the user has insufficient funds in his account and/or if the issuer determines that the portable consumer device being used by the user was somehow fraudulently obtained. The transit system access device at the exit transit location at the end of the user's journey may allow the user to exit if the system's evaluation indicates that the user has sufficient funds and/or credit in his account, or if the transit system determines that it will otherwise bear the risk of conducting the transaction.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a flash drive, a magnetic medium such as a hard-drive or a floppy disk, or an optical medium such as a data CD or DVD. Any such computer readable medium may reside on or within a single computational apparatus, and may be present on or within different computational apparatuses within a system or network.

Some embodiments of the present invention can be implemented in the form of control logic in software or hardware or a combination of both. The control logic may be stored in an information storage medium as a plurality of instructions adapted to direct an information processing device to perform a set of steps disclosed in an embodiment of the present invention. Based on the disclosure and teachings provided herein, a person of ordinary skill in the art will appreciate other ways and/or methods to implement the present invention.

As used herein, the use of "a", "an" or "the" is intended to mean "one or more", unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method of processing data initiated by a user, the method comprising:

receiving, at an access agency central computer, transaction data comprising a primary account number (PAN), an expiry date associated with the PAN, a time, and date from a gate access device, which interacted with a prepaid portable consumer device presented by the user at the gate access device of an access agency for requested access and received and validated the PAN and the expiry date from the prepaid portable consumer device and allowed access to the user based on the validated PAN and expiry date, wherein the prepaid portable consumer device stores the primary account number and the expiry date and was previously personalized to the user by the access agency central computer and was issued by the access agency instead of a third party outside of the access agency environment;

processing, at the access agency central computer, the transaction data from the gate access device and determining a fee amount at the access agency central computer for the requested access by performing a fare calculation at the access agency central computer based on the history of transactions for the prepaid portable consumer device and a fee policy defined by the access agency;

determining, by the access agency central computer, an account balance based on the determined fee amount and a prior balance amount associated with the prepaid portable consumer device; and reconciling the determined account balance and account data associated with the prepaid portable consumer device at an access agency system computer and generating and sending an authorization response message from the access agency system computer to the access agency central computer.

2. A method as in claim 1, wherein the prior balance amount comprises a numerical funds amount that is maintained on the portable consumer device by the access terminal.

3. A method as in claim 1, wherein the prior balance amount comprises a numerical funds amount that is stored in a data store that is external to the portable consumer device and is maintained by the access agency system computer.

4. A method as in claim 1, further including:
issuing the portable consumer device to the user from the access agency;
initiating a prior balance amount comprising a numerical funds amount that is associated with the portable consumer device.

5. A method as in claim 1 wherein the gate access device generated an authorization request message comprising the transaction data and the authorization request message is received by the access agency system computer.

6. A method as in claim 1 wherein the portable consumer device is in the form of a phone.

7. A method as in claim 1 wherein the gate access device and the portable consumer device include encryption keys and algorithms allowing the gate access device to authenticate the portable consumer device.

8. A method as in claim 1 wherein the gate access device generated an authorization request message comprising the primary account number associated with the portable consumer device, wherein the authorization request message is received by the access agency system computer.

9. A method as in claim 1 wherein the gate access device generated an authorization request message comprising the time and date of the transaction, a location of the transaction, and the primary account number associated with the portable consumer device, wherein the authorization request message is received by the access agency system computer.

10. A method as in claim 1 wherein a person associated with the portable consumer device is allowed to pass by the gate access device before the fee is determined by the access agency central computer.

11. A method as in claim 1 wherein a person associated with the portable consumer device is allowed to pass by the gate access device before the account balance is determined by the access agency central computer.

12. The method of claim 1 wherein the transaction data further comprises an on-card account balance stored in the prepaid portable consumer device.

13. The method of claim 1 wherein the account balance comprises a funding amount that is debited with each authorized transaction.

14. A system for processing an access request, the system comprising:
an access agency central computer that is configured to receive transaction data comprising a primary account number (PAN), an expiry date associated with the PAN, a time, and date from a gate access device, which interacted with a prepaid portable consumer device presented by a user at the gate access device of an access agency for requested access and received and validated the PAN and the expiry date from the prepaid portable consumer device and allowed access to the user based on the validated PAN and expiry date, and is configured to process the transaction data from the gate access device and determine a fee amount for the requested access by performing a fare calculation at the access agency central computer based on the history of transactions for the prepaid portable consumer device and a fee policy defined by the access agency, wherein the prepaid portable consumer access device stores the primary account number and the expiry date and was previously personalized to the user by the access agency central computer and was issued by the access agency instead of a third party outside of the access agency environment;
an access agency system computer that is configured to determine an account balance based on the determined fee amount and a prior balance amount associated with the prepaid portable consumer device, and is configured to reconcile the determined account balance and account data associated with the prepaid portable consumer device, and is configured to generate and send an authorization response message to the access agency central computer.

15. A system as in claim 14, wherein the prior balance amount comprises a numerical funds amount that is maintained on the portable consumer device by the access terminal.

16. A system as in claim 14, wherein the prior balance amount comprises a numerical funds amount that is stored in a data store that is external to the portable consumer device and is maintained by the access agency system computer.

17. A system as in claim 14, wherein the portable consumer device comprises a device that is issued to the user from the access agency, and includes a prior balance amount comprising a numerical funds amount that is associated with the portable consumer device.

* * * * *